United States Patent Office 3,236,871
Patented Feb. 22, 1966

3,236,871
3,5-DINITRO-o-TOLUHYDROXAMIC ACID AND ESTERS AND ANHYDRIDES THEREOF
Charles W. Hinman, Robert O. Dorton, and Walter Reifschneider, Midland, Mich., assignors to The Dow Chemical Company, Midland, Mich., a corporation of Delaware
No Drawing. Filed Feb. 9, 1961, Ser. No. 88,025
8 Claims. (Cl. 260—453)

The present invention relates to toluhydroxamic acids and is particularly directed to novel 3,5-dinitro-o-toluhydroxamic acids and their lower alkanol esters and anhydrides including mixed anhydrides of which at least one acid moiety is a 3,5-dinitro-o-toluhydroxamoyl group. The novel 3,5-dinitro-o-toluhydroxamic acid compounds correspond to the formula

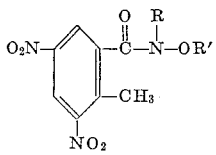

In this and succeeding formulas in the present specification and claims, R represents hydrogen or lower alkyl and R' represents R or an acyl radical selected from the group consisting of lower alkanoyl, halo-lower alkanoyl, 2,4-dinitro-o-toluoyl, and 3,5-dinitro-o-toluoyl. In the present specification and claims the expression lower alkyl refers to alkyl containing from one to four, inclusive, carbon atoms. The expression lower alkanoyl refers to alkanoyl containing from two to four, inclusive, carbon atoms. The novel compounds are crystalline solids of a white to pale yellow color soluble in many common organic solvents including benzene, acetone, alkanols and lower alkanoic acids; and of very low solubility in water. The compounds are useful as fungicides and insecticides for the protection of terrestrial plants, as selective terrestrial herbicides, and as herbicides in the control of submerged and floating aquatic vegetation. They are also of value as specific antiparasitic agents in the control of fungi, bacteria, and intestinal parasites of warm-blooded animals.

The acid and ester compounds of the present invention may be prepared by reacting a hydroxylamine compound, which may be hydroxylamine or substituted hydroxylamine or a mineral acid salt of such hydroxylamine compound with 3,5-dinitro-o-toluoyl chloride. In an alternative ester preparation, the said toluhydroxamic acid is first prepared and thereafter esterified as, for example by reaction with a desired alkyl halide in the presence of a hydrogen halide acceptor.

The anhydrides of the present invention are prepared by reacting an acyl halide or acid anhydride with the said toluhydroxamic acid which is to be a co-member of the desired anhydride of the present invention. Because many acid anhydrides are prepared from the acyl halides, it may be more economical to employ the acyl halide directly.

The moiety R in the above formula is conveniently introduced by the choice of substituted hydroxylamine whereupon, as substituent, the moiety R appears.

When employing 3,5-dinitro-o-toluoyl chloride and a hydroxylamine compound, to prepare an acid or ester of the present invention, hydrogen chloride of reaction is evolved, and may be neutralized in situ, by the inclusion, in the reaction mixture, of a hydrogen chloride neutralizing agent which may, conveniently, be sodium carbonate. The reaction by which the novel present compounds are prepared goes forward successfully over a wide temperature range and may be carried out at temperatures of from 10° C. to 150° C. A range of temperatures from approximately 15° C. to approximately 50° C. is convenient and effective, and is, therefore, preferred. Good results are obtained by carrying out the reaction in any convenient inert liquid reaction medium which may be, for example, water, a lower alkyl ether, benzene, or the like.

The said hydroxylamine compound and dinitro-o-toluoyl compound react in equimolecular proportions. The purification of the resulting product from a small excess of the hydroxylamine compound is usually easier than from an excess of the toluoyl compound, for which reason it is preferred to employ the hydroxylamine compound in a slight excess. When the hydroxylamine compound is employed as a mineral acid salt, for example as a hydrochloride, hydrogen halide neutralizing agent, which may be, for example, an alkali metal carbonate, is to be employed in an amount sufficient to neutralize and remove from the reaction the acid evolved as the free hydroxylamine componud is liberated. Thus the total amount of acid acceptor usually will be an amount equimolecular with all the hydrogen chloride bound in the starting materials; but the inclusion of a moderate excess is not injurious.

In one manner of carrying out the reaction, the hydrogen chloride acceptor and hydroxylamine compound are dispersed in a liquid reaction medium, which may, conveniently, be water. To the resulting mixture the 3,5-dinitro-o-toluoyl chloride is added slowly, portionwise, and with stirring. When nonaqueous reaction medium is employed, the addition of a small, catalytic amount of water is advantageous. The amount of water thus to be employed is not critical. The reaction is characteristically moderately exothermic and goes forward smoothly at room temperature during a period of from a few minutes to several hours with preparation of the desired 3,5-dinitro-o-toluhydroxamic acid, or, when employing an O-alkyl substituted hydroxylamine compound, the ester of such acid. Upon completion of the reaction, the desired product may precipitate in the form of crystals which are thereafter recovered as by decantation, filtration, or the like, and, if desired, washed with further portions of liquid; the product may remain dissolved, in which instance solvent may be removed, as by vacuum distillation, and the resulting product thereafter purified as, for example, by recrystallization from solvent. Further purification, when desired, is readily effected by further recrystallization from solvent.

When carrying out the preparation with the employment of the said toluoyl chloride and the said hydroxylamine compound in uncombined form rather than as a mineral acid salt, the reaction is carried out in similar manner, except that a correspondingly smaller amount of hydrogen chloride neutralizing agent is required.

In carrying out the preparation of an acid anhydride of the present invention, the acidic moieties to be condensed together to obtain such anhydride may be prepared in situ, as, for example, by the reaction of 3,5-dinitro-o-toluoyl chloride and a hydroxylamine compound: in which case hydrogen chloride neutralizing agent is employed in amount sufficient to neutralize evolved hydrogen chloride. The said anhydride and the said toluhydroxamic acid may both be present in the resulting reaction mixture. In such situation, the two said products are readily separated because of their great difference in solubility in common solvents.

The following examples illustrate the present invention but are not to be considered as limiting.

*Example 1*

A suspension was prepared by combining, in 350 milliliters diethyl ether, 16.8 grams (approximately 1/6 mole) sodium carbonate and 11.2 grams (approximately 1/6 mole) finely powdered hydroxylamine hydrochloride, and 38.8 grams (approximately 1/6 mole) powdered 3,5-dinitro-o-toluoyl chloride. To the resulting suspension was added 25 milliliters water. The resulting mixture was stirred continuously at room temperature for 3 hours to carry the reaction to completion. During the reaction a solid reaction product formed and settled in the mixture.

The solid residue was removed by filtration and repeatedly extracted with methanol. As a result of this extraction there was obtained, in methanol solution, 3,5-dinitro-o-toluhydroxamic acid; and as undissolved residue from the said extraction, the mixed anhydride of 3,5-dinitro-o-toluhydroxamic acid with 3,5-dinitro-o-toluic acid, corresponding to the formula

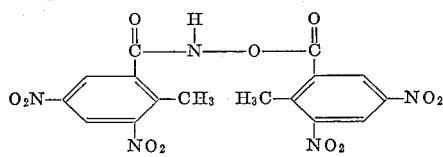

The hydroxamic acid product was recrystallized from aqueous methanol to obtain tan crystals melting at 162–163° C.

The said mixed toluhydroxamic-toluic anhydride was recrystallized from glacial acetic acid and from acetone to obtain a white crystalline mixed anhydride of 3,5-dinitro-o-toluhydroxamic acid with 3,5-dinitro-o-toluic acid melting at 244–246° C. The said hydroxamic acid was found upon analysis, to have a content of carbon and hydrogen of 39.88 and 2.76 percent respectively as compared with theoretical values of 39.89 and 2.93 percent. The said mixed anhydride was analyzed and found to have contents of carbon, hydrogen, and nitrogen of 42.59, 2.19 and 15.25 percent respectively as compared with theoretical values of 42.77, 2.97 and 15.59.

*Example 2*

To a solution of 6 grams (approximately 1/8 mole) O-methylhydroxylamine (also sometimes called methoxyamine) in 150 milliliters water at room temperature was added 7 grams (about 1/15 mole) anhydrous sodium carbonate. To the resulting solution was added, slowly, portionwise, and with continuous stirring, 12 grams (approximately 1/20 mole) 3,5-dinitro-o-tolyl chloride which dissolved in the resulting reaction mixture. The mixture was thereafter maintained at room temperature with continuous stirring for 1 hour, during which a solid reaction product formed. At the end of the reaction time the resulting product was separated as a residue by filtration, dissolved in hot acetone and recovered as crystals as the acetone cooled. The resulting methyl ester of 3,5-dinitro-o-toluhydroxamic acid was found to be a white crystalline material melting at 218.5–220° C. and upon analysis was found to have contents of carbon, hydrogen, and nitrogen of 42.79, 3.41 and 16.29 percent respectively as compared with theoretical values of 42.36, 3.56 and 16.47 percent.

Also, by the employment of O-ethylhydroxylamine and 3,5-dinitro-o-tolyl chloride, there is obtained an ethyl ester of 3,5-dinitro-o-toluhydroxamic acid. In similar manner, with the employment of O-normal-butylhydroxylamine and 3,5-dinitro-o-tolyl chloride, there is obtained a normal butyl ester of 3,5-dinitro-o-toluhydroxamic acid. If desired, a butylhydroxylamine may be employed whereof the butyl group is a mixture of the butyl isomers with the resulting preparation of a mixed butyl ester of 3,5-dinitro-o-toluhydroxamic acid wherein the butyl esterifying group comprises the various isomers.

*Example 3*

In 350 milliliters diethyl ether were suspended together 36.7 grams (approximately 1/7 mole) 3,5-dinitro-o-toluoyl chloride, 12.6 grams (approximately 1/7 mole) N-methyl-hydroxylamine hydrochloride and 16.5 grams (approximately 1/6 mole) anhydrous sodium carbonate, all reactants at room temperature (approximately 24° C.), and the solids in finely divided form. The resulting suspension was vigorously stirred and, during the stirring, 25 milliliters water was added at room temperature, whereupon a reaction began. After 2 hours stirring at room temperature, during which time the reaction went forward to completion, a resulting product solid was collected as residue by filtration. The filtrate liquid was gently warmed under sub-atmospheric pressure to vaporize and remove solvent and the solid thus recovered was removed and combined with the filtration residue previously described. The combined N-methyl-3,5-dinitro-o-toluhydroxamic acid product was taken up in hot methanol, the resulting solution allowed to cool, whereupon white crystals formed therein. The crystals were separated by filtration and dried and found to melt at 165–166° C., and upon analysis to have contents of carbon, hydrogen, and nitrogen corresponding to 42.60, 3.62, and 16.45 percent respectively as compared with theoretical values of 42.36, 3.56 and 16.47 percent.

In similar preparation, by the use of N-propylhydroxylamine hydrochloride and 3,5-dinitro-o-toluoyl chloride, there is obtained N-propyl-3,5-dinitro-o-toluhydroxamic acid. In similar preparation, N-isopropylhydroxylamine hydrochloride is employed with resulting preparation of the N-isopropyl-3,5-dinitro-o-toluhydroxamic acid.

*Example 4*

To a solution of 16 grams (approximately 1/6 mole) of N,O-dimethylhydroxylamine hydrochloride and 18 grams (approximately 1/6 mole) sodium carbonate in 250 milliliters water at room temperature was added, in a single portion 24.5 grams (approximately 1/10 mole), 3,5-dinitro-o-toluoyl chloride. The resulting reaction mixture was stirred for 1 hour at room temperature and the resulting solid reaction product separated therefrom by vacuum filtration through a Büchner funnel. The resulting product was recrystallized from ethanol to obtain pale needle crystals of the methyl ester of N-methyl-3,5-dinitro-o-toluhydroxamic acid, melting at 96–97.5° C. The product was found, upon analysis, to have contents of carbon, hydrogen, and nitrogen of 45.10, 4.09 and 15.72 as compared with theoretical values of 44.61, 4.12, and 15.61 respectively.

Other lower alkyl hydroxylamine hydrochloride compounds including mixed lower alkyl hydroxylamine hydrochloride compounds are also successfully employed in the same procedure.

For example, N,O-diethylhydroxylamine hydrochloride is reacted in the stated procedure with 3,5-dinitro-o-toluoyl chloride to obtain the ethyl ester of N-ethyl 3,5-dinitro-o-toluhydroxamic acid.

Similarly, by the employment of N,O-dibutylhydroxylamine hydrochloride there is obtained a butyl ester of N-butyl-3,5-dinitro-o-toluhydroxamic acid.

Also, when employing N-ethyl-O-propylhydroxylamine hydrochloride and 3,5-dinitro-o-toluoyl chloride there is obtained the propyl ester of N-ethyl-3,5-dinitro-o-toluhydroxamic acid.

*Example 5*

In 40 milliliters glacial acetic acid were dissolved ten grams 3,5-dinitro-o-toluhydroxamic acid and 10 milliliters acetic anhydride. The resulting reaction mixture was stirred at room temperature (about 22°C.). Under these conditions, reaction began and after about one hour a solid crystalline product began to separate from the reaction mixture. Stirring at room temperature was continued for approximately 24 hours and the resulting solid product separated from the reaction mixture by filtration. The liquid filtrate was warmed to vaporize and remove solvent and obtain a solid residue. The resulting residue was recrystallized first from methanol by addition of water and thereafter from benzene, and the thus recrystallized product was combined with the former crystalline product residue. The combined product was subsequently recrystallized from benzene to obtain a mixed anhydride of 3,5-dinitro-o-toluhydroxamic acid with acetic acid, melting at 170°–171° C. The crystalline product was found, upon analysis, to have contents of carbon, hydrogen, and nitrogen of 42.63, 2.91, and 14.66 percent respectively as compared with 42.41, 3.20, and 14.89 percent.

When the reaction medium employed in the present process is a lower alkanoic acid, some interchange may be expected to take place between the anhydride reactant and the acid solvent. Therefore, when it is desired to prepare a mixed toluhydroxamic anhydride according to the present invention whereof one of the acidic component moieties is a lower alkanoic acid moiety, if lower alkanoic acid be employed as solvent, it should be the lower alkanoic acid corresponding to the employed anhydride. However, if for such reasons as convenience or economy of starting materials, a mixed anhydride according to the present invention but of uncertain composition is to be prepared, then any convenient lower alkanoic acid may be employed as liquid reaction medium together with the anhydride of any other lower alkanoic acid.

When it is desired to prepare the compound in pure form and the lower alkanoic acid is inconvenient as reaction medium, good results are obtained with the employment of inert liquid reaction media, such as bezene, toluene, and the like.

By the employement of N-methyl-3,5-dinitro-o-toluhydroxamic acid and the anhydride of 2,4-dinitro-o-toluic acid there is obtained a mixed anhydride of N-methyl-3,5-dinitro-o-toluhydroxamic acid and 2,4-dinitro-o-toluic acid. This compound corresponds to the formula

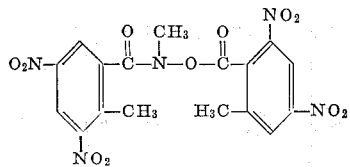

By the employment of propionic acid anhydride in the stated procedure instead of acetic acid anhydride, and benzene as solvent, there is obtained a mixed anhydride of N-methyl-3,5-dinitro-o-toluhydroxamic acid with propionic acid. In similar procedure, by the employment of the anhydrides of halo lower alkanoic acids, together with the said toluhydroxamic acid compounds, there are obtained mixed anhydrides of N-alkyl 3,5-dinitro-o-toluhydroxamic acid and halo-lower alkanoic acids. The method is applicable to the anhydrides of all the halo lower alkanoic acids containing from two to four, inclusive, carbon atoms and having, as halogen substituents, halogen selected from chlorine, bromine, and iodine, and the resulting products are comprehended within the present invention. For example, the employment together of the anhydride of 2,2-dichloropropionic acid, boiling at 196°–200° C., and N-ethyl-3,5-dinitro-o-toluhydroxamic acid, with benzene as reaction medium, obtains the mixed anhydride of N-ethyl-3,5-dinitro-o-toluhydroxamic acid and 2,2-dichloropropionic acid.

In similar preparations, employing the anhydride of 2-bromopropionic acid (boiling at approximately 120–125° C.) and N-isopropyl-3,5-dinitro-o-toluhydroxamic acid, in xylene as reaction medium, there is obtained the mixed anhydride of N-isopropyl-3,5-dinitro-o-toluhydroxamic acid and 2-bromopropionic acid.

Also, employing the anhydride of iodoacetic acid (which may also be called diiodoacetic anhydride) melting at approximately 46° C., and N-tert-butyl-3,5-dinitro-o-toluhydroxamic acid, in toluene as reaction medium, there is obtained the mixed anhydride of N-tert-butyl-3,5-dinitro-o-toluhydroxamic acid and iodoacetic acid.

Also, employing the anhydride of 2-bromoisobutyric acid (melting at approximately 63–65° C. and boiling, under 35 millimeters pressure at about 135–140° C.) together with 3,5-dinitro-o-toluhydroxamic acid, in benzene as reaction medium, there is obtained a mixed anhydride of 2-bromoisobutyric acid and 3,5-dinitro-o-toluhydroxamic acid.

*Example 6*

In 40 milliliters glacial acetic acid were dissolved together 10 grams N-methyl-3,5-dinitro-o-toluhydroxamic acid and 10 milliliters acetic anhydride. The resulting reaction mixture was heated to its boiling temperature (approximately 125° C.) and under reflux for 2 hours to carry the reaction to completion. Thereafter, the resulting mixture was heated under subatmospheric pressure to vaporize and remove acetic acid solvent, and obtain an oily product. This crude product has the useful properties which are characteristic of the pure compound of the present example. The crude product may be utilized as a parasiticide.

The said product was taken up in hot benzene and permitted to cool whereupon crystals of the mixed anhydride of N-methyl-3,5-dinitro-o-toluhydroxamic acid and acetic acid formed, and were again taken up and recrystallized from benzene to obtain a pale yellow crystalline product melting at 121–122.5° C., and having contents of carbon, hydrogen, and nitrogen of 44.77, 3.41 and 14.15 as compared with theoretical values of 44.45, 3.73 and 14.14 percent respectively. The compound corresponds to the formula

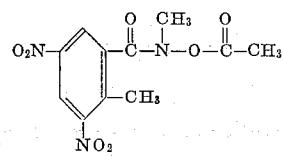

Similarly, when employing the anhydride of 2-iodobutyric acid, N-propyl-3,5-dinitro-o-toluhydroxamic acid, and, as reaction medium, benzene, there is obtained the mixed anhydride of the two said acids.

It will at once be apparent to skilled chemists that when a mixed anhydride of 3,5-dinitro-o-toluhydroxamic acid and another acid is prepared employing, as source of the other acidic moiety, an acid anhydride, only one acidic moiety of the said anhydride will join the 3,5-dinitro-o-toluhydroxamic acid in the formation of such mixed anhydride. This is of no major concern when employing a common acid anhydride such as acetic anhydride. However, when preparing a mixed anhydride in this manner which would require the employment of an uncommon and relatively expensive anhydride, starting material, such as the anhydride of 2,4-dinitro-o-toluic acid, a more advantageous method is available.

Such uncommon anhydrides are usually prepared in procedures in which the acyl halide, for example 2,4-dinitro-o-toluoyl chloride, is employed. Rather than synthesize the anhydride from the halide and then employ the anhydride with resulting waste of half the acidic moieties, one may employ, as starting materials in preparing the mixed anhydrides of the present invention, 3,5-dinitro-o-toluhydroxamic acid, the other acidic moiety as acyl halide, for example 2,4-dinitro-o-toluoyl chloride, and hydrogen halide neutralizing agent. The reaction is carried out in inert liquid reaction medium, all reactants and hydrogen halide acceptor may be employed in approximately equimolecular amounts, and the reaction is carried forward more promptly by the employment of gentle heating. Temperatures in the range of 30°

C.–100° C. are suitable, although higher and lower temperatures are successfully employed.

*Example 7*

Into 50 milliliters benzene are added 13.5 grams N-ethyl-3,5-dinitro-o-toluhydroxamic acid (approximately 0.05 mole) and 12.2 grams (approximately 0.05 mole) 2,4-dinitro-o-toluoyl chloride together with 2.65 grams (approximately 0.025 mole, an amount approximately stoichiometric with the employed acyl halide halogen) sodium carbonate, anhydrous weight. A few drops of water are added, also. The resulting reaction mixture is gently warmed to hasten the desired reaction, and is maintained, with stirring, at approximately 50° C. for approximately an hour to carry the reaction to completion.

The resulting crude product mixture may be employed directly to gain the advantages and employ the utilities of the products of the present invention. However, purification is not difficult. The crude product is washed with warm water, the wash water removed, the resulting washed product solution warmed to vaporize and remove solvent; the resulting dried product recrystallized from, for example, glacial acetic acid and the recrystallized product dried in a vacuum oven.

In similar preparations, employing 3,5-dinitro-o-toluhydroxamic acid and chloroacetyl chloride (boiling at 105° C.) there is obtained the mixed anhydride of 3,5-dinitro-o-toluhydroxamic acid and chloroacetic acid.

From the employment of 3,3,3,2-tetrachloropropionyl chloride (boiling at 140–142° C. under pressure of 12 millimeters mercury) and 3,5-dinitro-o-toluhydroxamic acid, there is obtained the mixed anhydride of 3,5-dinitro-o-toluhydroxamic acid and 3,3,3,2-tetrachloropropionic acid.

From the employment of α-bromoisobutyryl bromide and 3,5-dinitro-o-toluhydroxamic acid there is obtained the mixed anhydride of 3,5-dinitro-o-toluhydroxamic acid and α-bromobutyric acid.

Although sodium carbonate has been suggested as hydrogen halide neutralizing agent to be employed in certain reactions in the instant procedures, other such neutralizing agents may also be employed, if desired. For example, sodium bicarbonate, potassium carbonate; the carbonates, bicarbonates and hydroxides of any alkali metal, ammonia as a gas or as carbonate salt or hydroxide, certain organic bases which are known hydrogen halide acceptors such as pyridine, and the like. The identity of the halogen halide neutralizing agent is not critical, but may be selected for convenience and economy.

The present compounds are especially useful as parasiticides and herbicides in the control of submerged or floating aquatic vegetation. For such use and other uses, in which it is desired to utilize the biological activities of the compounds, the compound may be dispersed on an inert, finely divided solid and the resulting preparation employed as a dust. Also, such preparations may be dispersed in water with or without the aid of a wetting agent and the resulting aqueous suspensions employed as sprays. In other procedures, the compound may be employed in a solvent such as oil or as a constituent of solvent-in-water or water-in-solvent emulsions or as aqueous dispersions thereof which may be applied by spray, drench or wash. The compound, unmodified or with additaments, may be added to livestock or poultry feed or water, or may be administered as oral medicament in a pill, bolus, capsule or drench.

Good results are obtained when employing compositions containing ten or more parts of one of the present compounds per million parts by weight of composition.

In a representative operation, the exposure for a period of 24 hours of healthy, strongly growing plants of Anacharis spp. and Ceratophyllum spp. to water in which was dispersed N-methyl-3,5-dinitro-o-toluhydroxamic acid in the concentration of 25 parts by weight per million parts of ultimate aqueous dispersion, resulted in a 100 percent kill of the said Anacharis and 99 percent kill of the Ceratophyllum.

The preparation of certain compounds of the present invention calls for the use of various alkylhydroxylamines and their hydrochlorides. These may all be prepared in known procedures. As an example of one available method of preparation, see Berichte, 56–A, pages 207–208 (1923) and the further teaching in Berichte, 56–B, pages 1856–1860 (1923). The authors there used dimethyl sulfate as alkylating agent. However, as is known, good results are obtained when using other lower alkyl sulfates. Also, as an inexpensive and highly effective alkylating agent, an alkyl p-toluenesulfonate, such as propyl or butyl p-toluenesulfonate may be used. The hydrochlorides are prepared from the hydroxylamine compound and hydrochloric acid. In the procedures thus available, all the alkylhydroxylamines and their hydrochloride required in the practice of the present invention are easily prepared.

The anhydrides required as starting materials in the preparation of certain compounds of the present invention are all prepared in known procedures. In particular, the anhydrides of the dinitro-substituted aromatic acids are readily prepared in the manner set forth by Zeavin and Fisher for the preparation of the anhydride of 3,5-dinitrobenzoic acid. See the Journal of the American Chemical Society, 54, 3738–42 (1932).

The various lower aliphatic acid anhydrides and halo-lower aliphatic acid anhydrides are prepared in classical methods such as, for example, the reaction of an acyl halide with a light metal salt of the carboxylic acid, or the direct acylation of a carboxylic acid employing aryl halide in the presenece of a hydrogen chloride acceptor such as pyridine.

We claim:
1. A compound corresponding to the formula

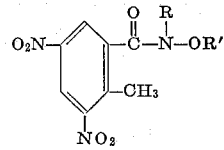

wherein R represents a member of the group consisting of hydrogen and alkyl containing from 1 to 4, inclusive, carbon atoms, and R' represents a member of the group consisting of R and lower alkanoyl, halolower alkanoyl, 2,4-dinitro-o-toluoyl, and 3,5-dinitro-o-toluoyl, wherein lower alkanoyl and halolower alkanoyl are defined as alkanoyl and haloalkanoyl groups, respectively, containing from 2 to 4, inclusive, carbon atoms and wherein halo represents a halogen selected from chlorine, bromine, and iodine.

2. 3,5-dinitro-o-toluhydroxamic acid.
3. Anhydride of 3,5-dinitro-o-toluhydroxamic acid with 3,5-dinitro-o-toluic acid.
4. Methyl ester of 3,5-dinitro-o-toluhydroxamic acid.
5. N-methyl-3,5-dinitro-o-toluhydroxamic acid.
6. Methyl ester of N-methyl-3,5-dinitro-o-toluhydroxamic acid.
7. Anhydride of 3,5-dinitro-o-toluhydroxamic acid with acetic acid.
8. Anhydride of N-methyl-3,5-dinitro-o-toluhydroxamic acid with acetic acid.

References Cited by the Examiner

UNITED STATES PATENTS 2,279,973  4/1942  Dietrich _____ 260—500
2,397,508  4/1946  Rouault et al. _____ 260—500

FOREIGN PATENTS 852,100  10/1960  Great Britain.

(Other references on following page)

OTHER REFERENCES

Alkiewicz et al., "Chem. Abstracts," vol. 52 (1958), p. 10277.

Alkiewicz et al., "Nature," vol. 180 (1957), pages 1204–1205.

Bright et al., J. Am. Chem. Soc., vol. 61, pages 618 to 629 (1939).

Frear, "Chemistry of the Pesticides," 3rd Ed. (1955), pages 103–107.

Yale, Chem. Rev., vol. 33, pages 209 to 256 (1943) (page 212 relied upon).

LORRAINE A. WEINBERGER, *Primary Examiner.*

CHARLES B. PARKER, LEON ZITVER, *Examiners.*